June 5, 1951 R. J. RINGLEE 2,555,999

RESET CIRCUIT FOR ECCLES-JORDAN TRIGGERED MULTIVIBRATOR CIRCUITS

Filed Oct. 9, 1950

Inventor:
Robert J. Ringlee,
by Paul A. Frank
His Attorney.

Patented June 5, 1951

2,555,999

UNITED STATES PATENT OFFICE 2,555,999

RESET CIRCUIT FOR ECCLES-JORDAN TRIGGERED MULTIVIBRATOR CIRCUITS

Robert J. Ringlee, Schenectady, N. Y., assignor to General Electric Company, a corporation of New York Application October 9, 1950, Serial No. 189,165

7 Claims. (Cl. 250—27)

Figure 1:
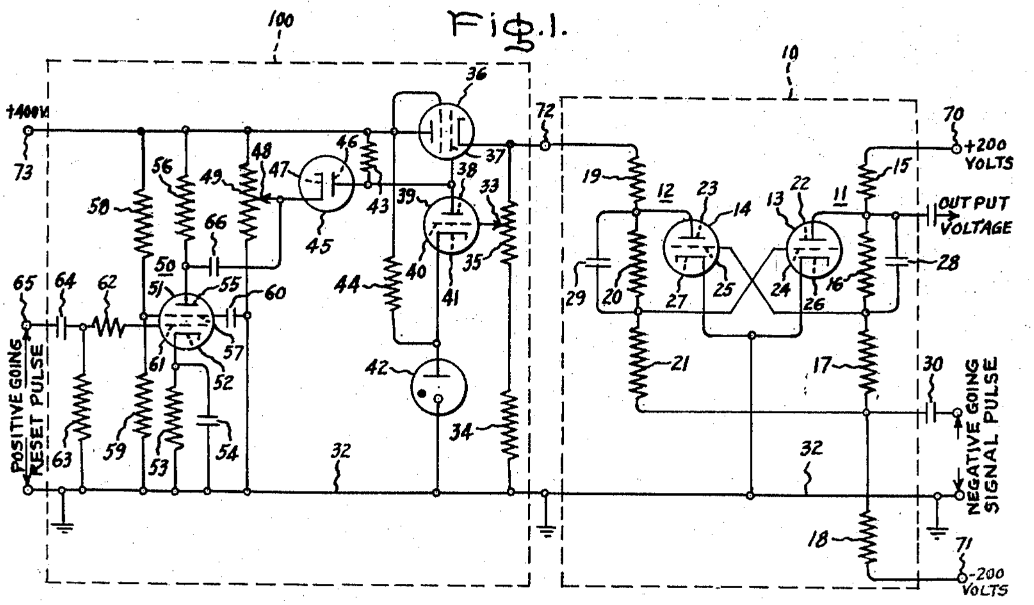

My invention relates to electric pulse counting apparatus and, more particularly, to an electric resetting circuit for pulse counting apparatus of the triggered multivibrator type which have become known as "Eccles-Jordan" or "flip-flop" circuits.

In such "Eccles-Jordan" or "flip-flop" circuits, a pair of electric discharge device amplifying stages are connected in a closed-loop circuit and usually with a common biasing network so that the discharge device of each stage is alternately maintained in one of two stable conditions of conduction; either non-conducting, or fully conducting. The transfer from one state to the other is initiated by upsetting the prevailing equilibrium with an input signal pulse, and is achieved with great rapidity due to the inherent regeneration of the closed-loop arrangement.

Due to their accuracy, stability, fast response, and dual-state operation, these "Eccles-Jordan" triggered multivibrator circuits have recently found extensive application in high speed calculating machines known as digital computers, and particularly in computers based upon a binary digital system.

In such binary digital computers, any number is represented as a predetermined combination of a plurality of powers of two so that only two digits, such as zero and one, are ever needed to express the number. When translated into an electrical representation, a circuit such as the above-mentioned circuit, with only two stable conditions of equilibrium is required; the "zero" digit being represented by one of these conditions and the "one" digit being represented by the other condition. A plurality of these dual-state circuits may, of course, be interconnected to represent any given number by a particular predetermined combination of their instantaneous conditions of equilibrium.

When "Eccles-Jordan" circuits are used in binary digital computers, they are normally energized by a series or "train" of electric pulses or "triggers"; the number of which represents the actual number to be recorder, stored, or otherwise counted, depending upon the particular function desired to be accomplished by the circuit. A plurality of these "Eccles-Jordan" circuits are varied in sequence between their alternate stable states, and the combination of their respective conditions after the final pulse of a train has passed determines the number electrically obtained. This number may be used immediately or may be stored by the maintenance of the various discharge devices of the circuit in their final stable conditions until it is used by the apparatus in a later step of the computation or other function involved.

One of the most vexatious problems which is encountered in the construction of such binary digital counting apparatus has been that of resetting the various "Eccles-Jordan" circuits after the recording or other utilization of a number by the apparatus in order to "erase" this former number so that a new number may be received. The problem involved is primarily one of speed. There are often a great many individual computations required in the particular mathematical relationship to be solved, or a sequence of a great many numbers in the intelligence to be recorded or electrically transmitted. The speed of reset is, of course, one of the prime factors in determining the total speed of the entire computation or of the entire numerical message transmitted.

Another important consideration is that of stability. Not only is it desirable that the resetting action be extremely rapid, but also it must be certain and must completely return the "Eccles-Jordan" circuits to their initial zero number condition before each successive number is introduced.

Accordingly, a principal object of my invention is to provide an improved electric reset circuit for "Eccles-Jordan" triggered multivibrator circuits.

In fulfillment of the above object, it is a further specific object of my invention to provide an improved resetting circuit for "Eccles-Jordan" circuits which operates with great rapidity and certainty, and is particularly well adapted for use in electric pulse counting apparatus based upon a binary digital system, and utilizing such "Eccles-Jordan" circuits.

In general, my invention is based upon the fact that a momentary interruption in the functioning of one electric discharge device in one of the two amplifying stages of an "Eccles-Jordan" triggered multivibrator operates to transfer that particular discharge device into a non-conducting condition immediately after the functional interruption has passed. In accordance with the present invention, this momentary functional interruption is accomplished by abruptly reducing the operating voltages of the discharge device which is to be rendered non-conducting, and immediately thereafter abruptly returning these operating voltages to their normal level. This momentary reduction of the operating voltages of the device is produced by an electric pulsing circuit associated with a unidirectional voltage source connected to supply voltage to the particular amplifying stage involved. The unidirectional voltage source includes a voltage regulating network, and the pulsing circuit cooperates with this voltage regulating network to produce an extremely rapid initial decay and subsequent rise of the pulsed output voltage as well as an extremely rapid recovery to normal operating voltage after a resetting electric pulse has passed.

The novel features which I believe to be characteristic of my invention, are set forth with particularity in the appended claims. My invention itself, however, together with further objects and advantages thereof can best be understood by reference to the following description taken in connection with the accompanying drawing in which Fig. 1 is a schematic diagram of an "Eccles-Jordan" triggered multivator circuit together with one embodiment of my electric resetting circuit connected thereto, and Fig. 2 contains a pair of curves portraying a typical wave shape of the voltage supplied to one side of the "Eccles-Jordan" circuit by the electric resetting circuit of Fig. 1 with a particular input reset voltage pulse supplied to the resetting circuit.

Referring to Fig. 1, I have shown one embodiment of my invention in conjunction with a conventional "Eccles-Jordan" triggered multivibrator circuit shown within a dashed line 10. The particular "Eccles-Jordan" circuit shown comprises a pair of amplifying stages 11 and 12 associated with respective ones of a pair of triode electric discharge devices 13 and 14 respectively.

The operating voltages for each stage are obtained from separate unidirectional voltage sources (not shown). The discharge device 13 is connected to receive voltage from a first voltage dividing network represented by resistors 15, 16, 17 and 18 connected from a high voltage terminal 70 of the one voltage source, indicated as +200 volts, to a negative voltage terminal 71 of a biasing voltage source, designated as −200 volts. A second voltage dividing network comprising resistances 19, 20, 21 and resistance 18 (which is common to both voltage dividing networks) is connected to supply operating voltages to the other discharge device 14. The high voltage end of this second voltage dividing network, however, is connected to an output terminal 72 of a resetting circuit, designated generally within dashed line 100, and which, in turn is arranged to receive voltage from a second high voltage source indicated as +400 volts.

Both voltage dividing networks associated with amplifying stages 11 and 12 are connected through the common resistance 18 to a point below ground (terminal 71) in order to produce a greater voltage gradient along the voltage dividing networks and, consequently, a more positive transitional action of the "Eccles-Jordan" circuit 10. Resistances 15 and 19, are preferably of equal value, as are resistances 16 and 20, as well as resistances 17 and 21 in order that each voltage dividing network will have corresponding impedances at their points of connection to the various electrodes of the discharge devices 13 and 14 respectively.

The actual connections for supplying the operating voltages to the discharge devices 13 and 14 are as follows. Anode 22 of discharge device 13 is connected to the point of connection between resistances 15 and 16, while anode 23 of discharge device 14 is connected to a corresponding point of connection between resistances 19 and 20. Grids 24 and 25 of discharge devices 13 and 14 respectively, are cross-connected to biasing voltages on opposite voltage dividing networks; grid 24 of discharge device 13 being connected to the point of connection between resistances 20 and 21 and grid 25 of discharge device 14 being connected to the point of connection between resistances 16 and 17. Cathodes 26 and 27 of discharge devices 13 and 14 respectively, are returned to a common grounded conductor 32.

Cross coupling of the instantaneous anode voltage developed by each stage to the input circuit of the opposite stage is accomplished by such means as capacitors 28 and 29 connected in parallel with resistances 16 and 20 respectively. It will be observed that the voltage developed at the anode 22 of discharge device 13 is coupled through capacitor 28 to the grid 25 of discharge device 14, while the voltage developed at anode 23 of discharge device 14 is coupled back to the grid 24 of discharge device 13 through capacitor 29. The input signal pulses to be counted are negative-going in polarity and are supplied to this "Eccles-Jordan" circuit 10 at the point of connection between resistances 17 and 18 through a direct current blocking capacitor 30. The output voltage of the circuit is usually taken from the anode of either discharge device 13 or 14.

It is to be understood that although I have described above a particular preferred type of "Eccles-Jordan" triggered multivibrator circuit, many other modifications of this basic circuit are well known, and the term "Eccles-Jordan triggered multivibrator circuit" as herein employed, is intended to refer to all such "flip-flop" triggered multivibrator circuits having two alternate states of equilibrium.

The operation of these "Eccles-Jordan" triggered multivibrator circuits is well known to those skilled in the art but will be repeated here in order to provide a better basis for understanding the resetting circuit of my invention. Let us assume that one discharge device, such as device 13, is in a condition of full conduction while the other discharge device, such as device 14 is initially non-conducting. When in this stable condition, the voltage at grid 24 is slightly positive with respect to cathode 26 of discharge device 13, and the voltage at anode 22 due to the heavy conduction through resistance 15 is comparatively low. As a result, the voltage at the point of connection between resistance 16 and 17 and, consequently, the voltage at the grid 25 of discharge device 14 is highly negative with respect to the cathode 27 of discharge device 14 so that the latter discharge device 14 is non-conducting. As a result, a relatively high voltage exists at the anode 23 of discharge device 14 which, in turn, causes the voltage at the point of connection between resistances 20 and 21 and consequently, the voltage at grid 24 of discharge device 13, to be maintained positive with respect to the cathode 26 of this latter device 13; the extent of the voltage difference between grid 24 and cathode 26 being, of course, determined by the amount of grid current flowing in the input circuit thereof. It will thus be seen that an initial condition of stable equilibrium is achieved in which discharge device 13 is fully conducting and discharge device 14 is maintained completely nonconducting.

In order to transfer the "Eccles-Jordan" circuit into an opposite condition of stable equilibrium wherein discharge device 14 is fully conducting and discharge device 13 is nonconducting, it is necessary only to supply a negative-going input electric pulse or "trigger" to both input circuits of the multivibrator. When such a negative-going trigger is supplied, the discharge device that happens to be cut-off is unaffected, but the discharge device that happens to be conducting is driven in a nonconducting direction. More specifically, the grid 25 of discharge device 14 is initially driven further below the current conduction cut-off point so that this previously nonconducting discharge device 14 is initially unaffected by the negative going trigger. However, as the grid 24 of discharge device 13 becomes more negative, the voltage at anode 22 becomes more positive, and this positive-going voltage variation is immediately transferred to the grid 25 of discharge device 14 through capacitor 28 in order to cause discharge device 14 to become conducting. As device 14 conducts, the voltage at anode 23 of the device 14 is rapidly reduced and functions to drive the grid 24 of discharge device 13 far below current conduction cut-off by virtue of the coupling through capacitor 29. As a consequence, discharge device 14 is rapidly driven to full conduction while discharge device 13 is immediately cut-off. This second condition of equilibrium will then be maintained until another negative-going signal pulse is supplied to the circuit.

Referring now to the resetting circuit 100 which supplies the operating voltage for one stage 12 of the "Eccles-Jordan" circuit 10, this resetting circuit 100 is adapted to receive an unregulated high voltage, such as the 400 volts indicated as being supplied between terminal 73 and the grounded conductor 32. A pair of impedances, represented by a resistance 34 and potentiometer 35, are connected in series with a current-regulating multi-electrode electric discharge device 36 to form a cathode-follower stage connected between the high voltage terminal 73 and conductor 32.

In order to produce across resistance 34 and potentiometer 35 a regulated output voltage which may be connected to energize one stage of the "Eccles-Jordan" circuit, means are included whereby the conduction of electric discharge device 36 may be varied inversely in accordance with any changes in the voltage developed across these series-connected impedances 34 and 35 so as to compensate for such changes. A control electrode 37 of the discharge device 36 is directly connected to an anode 38 of a voltage compensating electric discharge device 39. The control electrode 40 of this latter discharge device 39 is connected to receive the voltage produced at a movable tap 33 of potentiometer 35 while a cathode 41 of the discharge device 39 is connected through a gas filled voltage regulator tube 42 to grounded conductor 32. Anode 38 of compensating discharge device 39 is connected to a load impedance 43 to the high voltage side of the unregulated 400 volt source, while cathode 41 is also connected through a voltage dropping resistance 44 to the same high voltage side of the 400 volt source.

It will be appreciated that resistance 44 and voltage regulator tube 42 constitute a voltage dividing network across the 400 volt unregulated high voltage source. Due to the constant voltage characteristic of the voltage regulator tube 42, the voltage at the cathode 41 will, therefore, always remain constant, and its magnitude will depend upon the type and voltage rating of the voltage regulator tube 42.

In the operation of the above-described voltage regulating network, the compensating discharge device 39 is biased by adjustment of movable tap 33 of potentiometer 35 so that the conduction of discharge device 39 will produce a voltage drop across load impedance 43 and, consequently, a biasing voltage at control electrode 37 of regulating discharge device 36 sufficient to limit the current conduction of this latter discharge device 36 to a predetermined value producing a voltage drop across potentiometer 35 and resistance 34 substantially equal to the voltage (200 volts) supplied to the other stage 11 of the "Eccles-Jordan" circuit. If the output voltage across these latter impedances 34, 35 should thereafter tend, for example, to increase; the conduction of discharge device 39 will also increase causing a greater voltage drop across load impedance 43 and, consequently, a more negative voltage at grid 37 of the regulating discharge device 36. The reduction in the conduction of series-connected regulating discharge device 36 functions to correspondingly reduce the voltage across the impedances 34 and 35.

In order to reduce momentarily the output voltage produced from this voltage regulating network, a current rectifying discharge device such as diode rectifier 45, is connected in shunt with compensating discharge device 39 and voltage regulator tube 43 and a pulsing circuit is arranged to control the conduction of this diode discharge device 45 in response to an external reset pulse or trigger. An anode 46 of diode rectifier 45 is directly connected to the anode 38 of compensating discharge device 39, while a cathode 47 of the diode rectifier 45 is connected to a movable arm 48 of a potentiometer 49 connected across the unregulated high voltage source. Movable arm 48 is adjusted to provide a biasing voltage at the diode rectifier cathode 47 which is appreciably positive with respect to the voltage at anode 46 so as to render diode rectifier 45 normally non-conducting.

A pulse amplifier stage, designated generally by the numeral 50, is arranged to supply a negative-going pulse to the cathode 47 of the diode rectifier 45 in order to render the rectifier conductive upon the occurrence of a signal pulse. Pulse amplifier 50 may conveniently comprise a multi-electrode discharge device 51 having a cathode 52 connected through a biasing resistance 53 and by-pass capacitor 54 to grounded conductor 32, and having an anode 55 connected through a load impedance 56 to the high voltage side of the 400 volt source. Operating potentials for a screen electrode 57 are obtained by such means as a voltage dividing network comprising resistances 58 and 59 connected across the unregulated high voltage source. Varying voltages induced in the screen electrode 57 may be bypassed by such means as capacitor 60 connected from the screen electrode 57 to grounded conductor 32. A control grid 61 of the pulse amplifier discharge device 51 is connected through a current limiting resistance 62 and a coupling capacitor 64 to receive a positive-going electric pulse supplied between an input terminal 65 and grounded conductor 32. The input circuit of this pulse amplifier 50 is completed by a direct current return resistance 63. This positive input trigger is amplified by the pulse amplifier stage 50 and transmitted from the anode 55 through an output coupling capacitor 66 as an amplifier negative-going voltage pulse supplied to the cathode 47 of the diode current rectifying discharge device 45.

In the operation of this resetting circuit, a positive-going electric reset pulse supplied to the pulse amplifier stage 50 causes diode rectifier 45 to conduct and thereby substantially to short-circuit the grid circuit impedance of regulating discharge device 36 represented by compensating device 39 and voltage regulator tube 42. As a result, the voltage at the control electrode 37 of discharge device 36 is greatly reduced, and the voltage at the cathode of this regulating discharge device 36 tends to follow the grid voltage in a manner quite similar to a conventional cathode follower stage. The conduction of regulating discharge device 36 is almost completely cut-off and the voltage across resistance 34 and potentiometer 35 reduced to a low value.

As the trailing edge of the positive-going reset pulse reaches the control electrode 61 of the pulse amplifier 51, the diode discharge device 45 is immediately transferred back to its initial non-conducting state, and the voltage output of the voltage regulator circuit immediately returns to its normal operating level. The voltage delivered one side, such as amplifying stage 12, of the "Eccles-Jordan" circuit will, therefore, vary in the form of a negative-going square wave whose duration depends primarily upon the duration of the positive-going electric reset pulse.

The effect of supplying this negative-going square wave voltage pulse to the amplifying stage 12 of the "Eccles-Jordan" circuit 10 is such as to return the "Eccles-Jordan" circuit 10 to the condition where discharge device 14 is non-conducting and discharge device 13 is conducting regardless of the condition of the circuit before the square wave resetting pulse was supplied thereto. If, for example, the "Eccles-Jordan" circuit was in the condition where discharge device 14 was heavily conducting and discharge device 13 was non-conducting immediately prior to the application of this resetting voltage pulse, then the following train of events occurs. As the voltage on anode of discharge device 14 is abruptly reduced due to the leading edge of this negative going square wave pulse, the grid 24 of discharge device 13 is also driven far negative with respect to its cathode 26 due to the instantaneous coupling through capacitor 29. The voltage at the anode of discharge device 13 is, therefore, rapidly increased, and this increase of voltage is transferred back to the grid 25 of discharge device 14 through capacitor 28. As a result, discharge device 14 is maintained in its conductive state but the magnitude of the conduction is, of course, reduced due to the reduced anode voltage thereon. However, as the trailing edge of this negative-going anode voltage pulse reaches the discharge device 14, the voltage at anode 23 is rapidly increased thereby, and the voltage at the grid of discharge 13 is driven highly positive with respect to the anode 26 thereof. The voltage at anode 22 is correspondingly decreased, and this rapid decrease is transmitted through coupling capacitor 28 back to the control electrode 25 of discharge device 14 in order to render this latter device non-conducting. Since there is no further change in the operating voltages supplied from the voltage regulating network, the "Eccles-Jordan" circuit will, therefore, remain in this latter condition until a train of negative triggers representing a succeeding number to be counted is supplied to the circuit. The same series of events will, of course, occur if the discharge device 14 was initially non-conducting.

Figure 2:
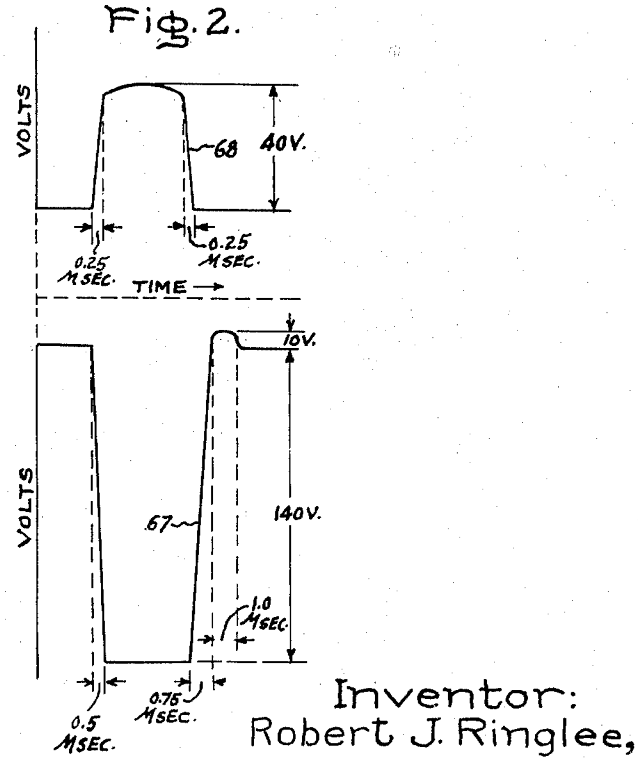

It will be appreciated that by using a pulse type extinguishing circuit, represented by the pulse amplifier stage 50 and rectifier device 46, in conjunction with a voltage regulated power supply, I have produced a resetting circuit for "Eccles-Jordan" triggered multivibrators which operates with extremely high speed and yet has fast recovery. Referring to Fig. 2, I have shown as curve 67 a typical wave shape of the square wave voltage pulse which is derived from the above-described resetting circuit. The voltage wave portrayed by curve 67 is that which may typically be obtained with a positive reset pulse, such as shown by curve 68 of Fig. 2, having a few microseconds duration with a .25 microsecond rise and decay, and having a pulse amplitude of approximately 40 volts. With a resetting pulse of this character, the rise and decay times of this resetting circuit square wave output voltage, shown by curve 68 of Fig. 2, has been found to be approximately 0.5 microseconds and .75 microseconds respectively, with an amplitude of approximately 140 volts. The over-shoot positive-going pulse of this staged square wave 67 is relatively small amplitude, as shown, and is approximately only one microsecond in duration, indicating an extremely fast recovery time. It will be appreciated that the rise and decay times of this output voltage pulse will normally be extremely short even though the capacity in the load circuit represented by the "Eccles-Jordan" circuit may be quite high. This is because the internal impedance of the series regulator discharge device 36 is very low during the period of conduction of diode discharge device 46, with the result that the combination of capacity and resistance involved will have a very short time constant.

It is to be understood that although I have shown only one such "Eccles-Jordan" circuit as being operated by the resetting circuit 100 any number of these "Eccles-Jordan" circuits could be operated in parallel by the same resetting circuit. Only a single separate voltage source would then be necessary for the remaining opposite stages of these "Eccles-Jordan" circuits.

It is also to be understood that although I have shown a particular embodiment of my invention, many modifications could be made and I, therefore, intend by the appended claims to cover all such modifications as fall within the true spirit and scope of my invention.

What I claim as new and desire to secure by Letters Patent of the United States is:

1. An electric reset circuit for an "Eccles-Jordan" triggered multivibrator circuit of the type having a pair of electric discharge devices, each interconnected to be alternately varied between a stable conducting condition and a stable non-conducting condition in response to consecutive electric signal pulses comprising, a unidirectional voltage source, an electric discharge device having a cathode, an anode and at least one control electrode connected as a cathode follower stage across said voltage source, voltage compensating means connected in the control electrode to cathode circuit of said cathode follower discharge device to maintain a constant regulated output voltage from said cathode follower stage, said regulated voltage being connected to supply operating voltage to a predetermined one of the discharge devices of said "Eccles-Jordan" circuit, and current conducting means connected in shunt with said voltage compensating means and only operative in response to a resetting electric pulse to reduce momentarily the regulated voltage supplied to said one "Eccles-Jordan" discharge device, thereby to transfer said one "Eccles-Jordan" discharge device into a stable non-conducting condition.

2. In combination, an "Eccles-Jordan" triggered multi-vibrator circuit having a pair of electric discharge devices interconnected to be alternately varied between two stable current conducting conditions in response to consecutive electric signal pulses, a first unidirectional voltage source connected to supply operating voltage to one of said discharge devices, a second unidirectional voltage source including voltage regulating means and connected to supply a regulated operating voltage to the other one of said pair of discharge devices, current rectifying means in shunt with said regulating means and biased to be normally non-conducting, and a pulse amplifier connected to supply, in response to an input resetting pulse, an output voltage pulse to said rectifying means sufficient to overcome said bias to render said rectifying means conductive and thereby to reduce momentarily the regulated voltage supplied to said other one of said discharge devices.

3. In combination, an "Eccles-Jordan" triggered multivibrator circuit having a pair of electric discharge devices interconnected to be alternately varied between two stable current conducting conditions in response to consecutive electric signal pulses, a first unidirectional voltage source connected to supply operating voltage to one of said multivibrator discharge devices, a second unidirectional voltage source, a third electric discharge device having a cathode, an anode, and at least one control electrode connected as a cathode follower stage across said second voltage source, voltage compensating means connected in the control electrode-to-cathode circuit of said third discharge device to maintain a constant regulated output voltage from said cathode follower stage, said regulated voltage being connected to supply operating voltage to the other one of said pair of multivibration discharge devices, and electric current rectifying means connected in shunt with said voltage compensating means and adapted to be rendered conductive only in response to a resetting electric pulse to reduce momentarily the regulated output voltage of said cathode follower stage and thereby to transfer said "Eccles-Jordan" circuit into a predetermined one of said stable current conducting conditions.

4. An electric reset circuit for an "Eccles-Jordan" triggered multivibrator circuit of the type having a pair of electric discharge devices interconnected to be alternately varied between two stable current conducting conditions in response to consecutive electric signal pulses comprising, a power supply including voltage regulating means and connected to supply a regulated operating voltage to one of said pair of discharge devices, current rectifying means connected in shunt with said regulating means and biased to be normally non-conducting, and a pulse amplifier connected to supply, in response to an input resetting pulse, an output voltage pulse to said rectifying means sufficient to overcome said bias to render said rectifying means conductive and thereby to reduce momentarily the regulated voltage supplied to said one discharge device of said "Eccles-Jordan" circuit.

5. An electric reset circuit for an "Eccles-Jordan" triggered multivibrator circuit comprising, a unidirectional voltage source, a first electric discharge device having a cathode, an anode, and at least one control electrode connected as a cathode follower stage across said voltage source, voltage compensating means connected in the control electric-to-cathode circuit of said discharge device to maintain a constant regulated output voltage from said cathode follower stage, said regulated voltage being connected to supply operating voltage to a predetermined one of the amplifying stages of said "Eccles-Jordan" circuit, current rectifying means connected in shunt with said voltage compensating means, and a pulse amplifier stage connected to render said current rectifying means conductive in response to a resetting electric pulse supplied to said pulse amplifier stage thereby to reduce momentarily the regulated voltage supplied to said one stage of said "Eccles-Jordan" circuit.

6. An electric reset circuit for an "Eccles-Jordan" triggered multivibrator circuit comprising a unidirectional voltage source, an electric discharge device having a cathode, an anode and at least one control electrode connected in series with a cathode impedance as a cathode follower stage across said voltage source, voltage compensating means connected in the control-electrode-cathode circuit of said discharge device to maintain a constant regulated voltage at said cathode, said regulated voltage being adapted to supply an operating voltage to a predetermined one of the stages of said "Eccles-Jordan" circuit, current rectifying means connected in shunt with said voltage compensating means, voltage biasing means connected to said current rectifying means to render said current rectifying means normally non-conducting, and a pulse amplifier connected to said biasing means and operative in response to a resetting electric pulse to render said current rectifying means momentarily conductive thereby to reduce momentarily the regulated voltage supplied by said cathode follower stage.

7. An electric reset circuit for "Eccles-Jordan" triggered multivibrator circuits comprising a unidirectional voltage source, a first electric discharge device having a cathode, an anode and at least one control electrode connected in series with a voltage dividing network across said voltage source, a second electric discharge device having a cathode, an anode and at least one control electrode connected in series with an anode load impedance across said voltage source, said second discharge device being connected to receive at its control electrode a voltage developed across a portion of said voltage dividing network and to supply its anode voltage to the control electrode of said first electric discharge device, a diode rectifier connected from the anode of said second discharge device to the low voltage side of said unidirectional voltage source, biasing means for rendering said diode rectifier normally non-conducting, and a pulse amplifier stage connected to said biasing means for rendering said diode rectifier conductive in response to an electric resetting pulse supplied to said pulse amplifier stage thereby to reduce momentarily the voltage produced at the cathode of said first electric discharge device.

ROBERT J. RINGLEE.

No references cited.